(12) United States Patent
You et al.

(10) Patent No.: US 10,158,252 B2
(45) Date of Patent: Dec. 18, 2018

(54) WIRELESS POWER RELAY DEVICE AND WIRELESS POWER TRANSMISSION SYSTEM

(71) Applicant: LS CABLE & SYSTEM LTD, Anyang-si, Gyeonggi-do (KR)

(72) Inventors: Sung-Han You, Seoul (KR); Young-Sun Kim, Gunpo-si (KR); Un-Kyu Park, Hwaseong-si (KR)

(73) Assignee: LS CABLE & SYSTEM LTD., Anyang-si, Gyeonggi-Do (KR)

(*) Notice: Subject to any disclaimer, the term of this patent is extended or adjusted under 35 U.S.C. 154(b) by 92 days.

(21) Appl. No.: 15/308,180

(22) PCT Filed: May 2, 2014

(86) PCT No.: PCT/KR2014/003981
§ 371 (c)(1),
(2) Date: Nov. 1, 2016

(87) PCT Pub. No.: WO2015/167055
PCT Pub. Date: Nov. 5, 2015

(65) Prior Publication Data
US 2017/0054329 A1 Feb. 23, 2017

(51) Int. Cl.
*H02J 50/50* (2016.01)
*H02J 50/12* (2016.01)
*H02J 7/02* (2016.01)

(52) U.S. Cl.
CPC .............. *H02J 50/12* (2016.02); *H02J 7/025* (2013.01); *H02J 50/50* (2016.02)

(58) Field of Classification Search
CPC ....................................................... H02J 50/50
See application file for complete search history.

(56) References Cited

U.S. PATENT DOCUMENTS

| 2010/0109445 A1 | 5/2010 | Kurs et al. | |
| 2010/0201201 A1* | 8/2010 | Mobarhan | H02J 5/005 307/104 |
| 2012/0001497 A1* | 1/2012 | Sada | H02J 5/005 307/104 |
| 2012/0313577 A1 | 12/2012 | Moes et al. | |

(Continued)

FOREIGN PATENT DOCUMENTS

| JP | 2012-075304 A | 4/2012 |
| JP | 2013-081367 A | 5/2013 |

(Continued)

OTHER PUBLICATIONS

International Search Report for PCT/KR2014/003981 dated Jan. 27, 2015 from Korean Intellectual Property Office.

*Primary Examiner* — Rexford Barnie
*Assistant Examiner* — David Shiao
(74) *Attorney, Agent, or Firm* — K&L Gates LLP (57) ABSTRACT

The present invention is mainly directed to providing a wireless power relay device and a wireless power transmission device, which are capable of arranging a relay coil having higher transmission efficiency in a transmission-efficiency reducing section having lower transmission efficiency than those of a plurality of relay coils, thereby preventing power transmission efficiency from sharply decreasing in the transmission-efficiency reducing section.

6 Claims, 5 Drawing Sheets

(56) References Cited

U.S. PATENT DOCUMENTS

| | | | |
|---|---|---|---|
| 2013/0300205 A1 | 11/2013 | Tzanidis et al. | |
| 2014/0028112 A1* | 1/2014 | Hui | H02J 5/005 307/104 |
| 2014/0044293 A1* | 2/2014 | Ganem | H02J 7/025 381/323 |
| 2014/0142876 A1* | 5/2014 | John | H02J 5/005 702/60 |
| 2014/0203773 A1* | 7/2014 | Kim | H02J 17/00 320/108 |
| 2015/0008753 A1* | 1/2015 | Park | H03H 7/40 307/104 |
| 2015/0045227 A1* | 2/2015 | Ahn | H01F 38/14 505/163 |
| 2015/0115725 A1* | 4/2015 | Kang | H01F 38/14 307/104 |
| 2016/0172892 A1* | 6/2016 | Satyamoorthy | H02J 7/025 320/108 |

FOREIGN PATENT DOCUMENTS

| | | |
|---|---|---|
| JP | 2014-064446 A | 4/2014 |
| KR | 10-1118471 B1 | 3/2012 |
| KR | 10-2012-0040779 A | 4/2012 |
| KR | 10-2013-0099103 A | 9/2013 |
| KR | 10-2013-0125735 A | 11/2013 |

* cited by examiner

WIRELESS POWER RELAY DEVICE AND WIRELESS POWER TRANSMISSION SYSTEM

CROSS REFERENCE TO PRIOR APPLICATION

This application is a National Stage Patent Application of PCT International Patent Application No. PCT/KR2014/003981 (filed on May 2, 2014) under 35 U.S.C. § 371, which is hereby incorporated by reference in its entirety.

TECHNICAL FIELD

One embodiment of the present invention relates to a wireless power relay device and a wireless power transmission system using the same.

BACKGROUND ART

Wireless power transmission is a technique of wirelessly supplying power to household appliances or electric cars rather than using a power line which is an existing cable. This technique is advantageous in that a device which needs to be supplied power can be charged wirelessly without having to connect the device to a power outlet using a power cable. Thus, research related thereto has been actively conducted.

Wireless power transmission techniques are largely divided into a magnetic induction method, a magnetic resonance method, and a microwave method. The microwave method is a technique of transmitting power by emitting super-high-frequency electromagnetic waves such as microwaves via an antenna. When microwave method is used, long-distance wireless power transmission may be performed but a safety problem caused by electromagnetic waves should be considered. The magnetic induction method is a technique using magnetic inductive coupling between adjacent coils, wherein the distance between two power transmission/reception coils is several centimeters or less and transmission efficiency depends greatly on the arrangement of the two coils. The magnetic resonance method is a technique of transmitting non-radial magnetic-field energy between two resonators spaced from each other through resonant coupling, wherein wireless power transmission may be performed when the distance between power transmission/reception coils is about 1 to 2 m. The magnetic resonance method is more advantageous than the magnetic induction method, in that it is relatively flexible in the arrangement of two coils and a range of wireless charging may be extended using relay coils.

However, when a magnetic field generated by a wireless power transmitter is relayed to a wireless power receiver through relay coils, a flux sum of some relay coils is small due to characteristics of values K and Q thereof and thus charging may not be successfully performed.

In this connection, the invention disclosed in Korean laid-open patent application No. 2012-0040779 concerns a wireless power transmission device which transmits or receives a power signal according to the magnetic resonance method. The wireless power transmission device includes a base coil and a plurality of relay coils, wherein the number of turns of the plurality of relay coils is greater than the number of turns of the base coil.

However, the invention in Korean laid-open patent application No. 2012-0040779 employs the plurality of same relay coils but does not disclose a problem that power cannot be transmitted at a position on a relay coil system or the efficiency of power transmission is very low at this position and a solution thereto.

The invention disclosed in Korean patent No. 1118471 concerns wireless power transmission according to the magnetic induction method, wherein transmission and reception coils are formed of two types of conductive lines.

However, the transmission and reception coils disclosed in the invention in Korean patent No. 1118471 are not relay coils, and a problem that power cannot be transmitted at a position on a relay coil system or the efficiency of power transmission is very low at this position and a solution thereto are not disclosed in this invention.

The invention disclosed in Japanese laid-open patent application No. 2012-0075304 concerns a relay device for magnetic-resonance wireless power transmission, wherein a plurality of relay coils are arranged in a direction of a plane. This invention is mainly directed to improving relaying efficiency.

However, the invention in Japanese laid-open patent application No. 2012-0075304 does not disclose a problem that power cannot be transmitted at a position on a relay coil system or the efficiency of power transmission is very low at this position and a solution thereto.

DETAILED DESCRIPTION OF THE INVENTION

Technical Problem

The present invention is mainly directed to providing a wireless power relay device and a wireless power transmission device, which are capable of arranging a relay coil having higher transmission efficiency in a transmission-efficiency reducing section having lower transmission efficiency than those of a plurality of relay coils, thereby preventing power transmission efficiency from sharply decreasing in the transmission-efficiency reducing section.

Purposes of the present invention are not, however, limited thereto, and any further purposes thereof will become apparent and more readily appreciated from the following description.

Technical Solution

According to an aspect of the present invention, there is provided a wireless power relay device which relays a magnetic field generated by a wireless power transmission device, the wireless power relay device comprising a plurality of relay coils configured to capture and relay the magnetic field, wherein, when a transmission-efficiency reducing section occurs, at least one relay coil included in the transmission-efficiency reducing section among the plurality of relay coils relays the magnetic field to be out of phase with the magnetic field relayed by the other coils, wherein in the transmission-efficiency reducing section, transmission efficiency of a first relay coil spaced from the wireless power transmission device among the plurality of relay coils is lower than that of a second relay coil adjacent to the first relay coil and farther from the wireless power transmission device than the first relay coil.

The at least one relay coil may be arranged close to the other relay coils.

The at least one relay coil may have a larger coupling coefficient than coupling coefficients of the other relay coils.

The at least one relay coil may comprise a plurality of coils.

The at least one relay coil comprises a plurality of coils having different internal diameters, wherein, among the plurality of coils having different internal diameters, an inner coil having a smaller internal diameter is included in an outer coil having a larger internal diameter.

When the plurality of relay coils are arranged in a line with respect to the wireless power transmission device, the transmission-efficiency reducing section may be a section in which a relay coil next to a relay coil farthest from the wireless power transmission device is located, and the at least one relay coil is located in the transmission-efficiency reducing section.

The at least one relay coil may have a larger coupling coefficient than coupling coefficients of the other relay coils.

The at least one relay coil may comprise a plurality of coils.

The at least one relay coil may comprise a plurality of coils having different internal diameters, wherein, among the plurality of coils having different internal diameters, an inner coil having a smaller internal diameter is included in an outer coil having a larger internal diameter.

When the plurality of relay coils are arranged on a plane, the transmission-efficiency reducing section may be a section in which a relay coil spaced by an odd number of hops from a relay coil next to the wireless power transmission device is located, and the at least one relay coil is located in the transmission-efficiency reducing section.

The at least one relay coil may have a larger coupling coefficient than coupling coefficients of the other relay coils.

The at least one relay coil may comprise a plurality of coils.

The at least one relay coil may comprise a plurality of coils having different internal diameters, wherein, among the plurality of coils having different internal diameters, an inner coil having a smaller internal diameter is included in an outer coil having a larger internal diameter.

According to another aspect of the present invention, there is provided a wireless power transmission system comprising a wireless power transmission device configured to transmit power through a magnetic field; and a wireless power relay device including a plurality of relay coils configured to capture and relay the magnetic field, wherein, when a transmission-efficiency reducing section occurs, at least one relay coil included in the transmission-efficiency reducing section among the plurality of relay coils relays the magnetic field to be out of phase with the magnetic field relayed by the other coils, wherein in the transmission-efficiency reducing section, transmission efficiency of a first relay coil spaced from the wireless power transmission device among the plurality of relay coils is lower than that of a second relay coil adjacent to the first relay coil and farther from the wireless power transmission device than the first relay coil.

The at least one relay coil may be arranged close to the other relay coils.

The at least one relay coil may have a larger coupling coefficient than coupling coefficients of the other relay coils.

The at least one relay coil may comprise a plurality of coils.

The at least one relay coil may comprise a plurality of coils having different internal diameters, wherein, among the plurality of coils having different internal diameters, an inner coil having a smaller internal diameter is included in an outer coil having a larger internal diameter.

When the plurality of relay coils are arranged in a line with respect to the wireless power transmission device, the transmission-efficiency reducing section may be a section in which a relay coil next to a relay coil farthest from the wireless power transmission device is located, and the at least one relay coil is located in the transmission-efficiency reducing section.

The at least one relay coil may have a larger coupling coefficient than coupling coefficients of the other relay coils.

The at least one relay coil may comprise a plurality of coils.

The at least one relay coil may comprise a plurality of coils having different internal diameters, wherein, among the plurality of coils having different internal diameters, an inner coil having a smaller internal diameter is included in an outer coil having a larger internal diameter.

When the plurality of relay coils are arranged on a plane, the transmission-efficiency reducing section may be a section in which a relay coil spaced by an odd number of hops from a relay coil next to the wireless power transmission device is located, and the at least one relay coil may be located in the transmission-efficiency reducing section.

The at least one relay coil may have a larger coupling coefficient than coupling coefficients of the other relay coils.

The at least one relay coil may comprise a plurality of coils.

The at least one relay coil may comprise a plurality of coils having different internal diameters, wherein, among the plurality of coils having different internal diameters, an inner coil having a smaller internal diameter is included in an outer coil having a larger internal diameter.

Advantageous Effects

According to one of the embodiments of the present invention described above, transmission efficiency in a wireless power relay device including a plurality of relay coils may be prevented from sharply decreasing.

MODE OF THE INVENTION

The present invention may be embodied in many different forms and accomplished in various embodiments. Thus, exemplary embodiments are illustrated in the drawings and described in detail in the present disclosure. However, the present invention is not limited thereto and should be understood to cover all modifications, equivalents, and alternatives falling within the technical idea and scope of the invention.

In describing the preset invention, well-known techniques are not described in detail if it is determined that they would obscure the invention due to unnecessary detail. As used herein, ordinal numbers (e.g., first, second, etc.) are merely signs for distinguishing one element from another element.

In the present disclosure, it will be understood that when an element is referred to as being 'coupled' or 'connected' to another element, the element may be directly coupled or connected to another element but may be coupled to connected to another element via an intervening element unless otherwise indicated.

In the present disclosure, a wireless power receiving device is an electric/electronic device including a chargeable battery therein or a device connected to an external electric/electronic device to supply charging current. The wireless power receiving device may be a mobile device (such as a mobile phone, a smart phone, a laptop computer, a digital broadcasting terminal, a personal digital assistant (PDA), a portable multimedia player (PMP), or a navigation device) or an electronic device (such as a wall-mounted television (TV), a desk lamp, an electronic picture frame, or a vacuum cleaner).

Hereinafter, embodiments of the present invention will be described in detail with reference to the accompanying drawings.

Figure 1:
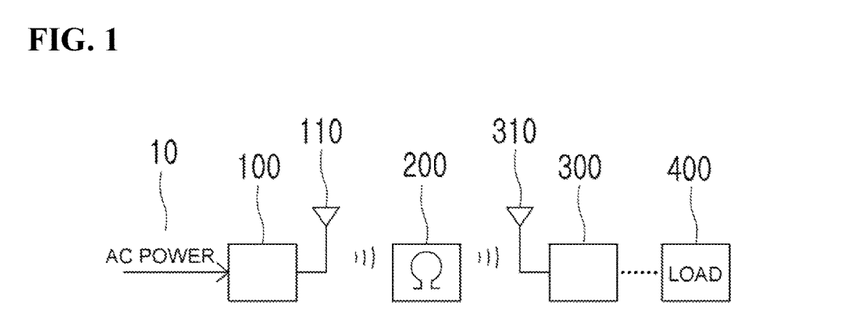
FIG. 1 is a schematic diagram of a wireless power transmission system according to an embodiment of the present invention.

FIG. 1 is a schematic diagram of a wireless power transmission system according to an embodiment of the present invention.

As illustrated in FIG. 1, a wireless power transmission device according to the present invention includes a wireless power transmission device 100 and a wireless power relay device 200 including at least one relay coil. The wireless power relay device 200 is provided in a path from the wireless power transmission device 100 to a wireless power receiving device 300 and relays a power signal to the wireless power receiving device 300 according to the magnetic resonance method.

The wireless power transmission device 100 generates a magnetic field to transmit power. The wireless power relay device 200 relays the magnetic field to the wireless power receiving device 300 by using a plurality of relay coils which magnetically resonate with the magnetic field. The wireless power receiving device 300 is coupled to the magnetic field relayed by the wireless power relay device 200 to generate output power to be stored or consumed therein.

The wireless power transmission device 100, the wireless power relay device 200, and the wireless power receiving device 300 are configured to have a mutual resonance relationship at a specific frequency. When resonant frequencies of adjacent devices are the same or substantially the same, power transmission efficiency between these devices is inversely proportional to the square of the distance between these devices.

The wireless power transmission device 100 includes a power transmission coil 110 as a power transmission means, and converts an external input power source 10 into a radio-frequency (RF) power signal of a desired frequency and supplies it to the power transmission coil 110 to generate a magnetic field around the power transmission coil 110.

The wireless power receiving device 300 includes a power reception coil 310 as a power reception means, and receives the RF power signal from the magnetic field via the power reception coil 310 coupled to either the power transmission coil 110 or a relay coil of the wireless power relay device 200 adjacent to the power transmission coil 110 in a resonant state at a specific frequency. The received RF power signal is converted into a DC power output, and used as power for driving the wireless power receiving device 300 or supplied to a battery or an external load device 400.

The wireless power relay device 200 may include at least one relay coil. The at least one relay coil may be arranged at a regular interval. A diameter of the at least one relay coil and the number of turns thereof may be set to maximize wireless power transmission efficiency. Each of the at least one relay coil may include a coil 210 wound a certain number of times, and a capacitor 220 connected in parallel to the coil 210 for a purpose of resonating and impedance matching as illustrated in FIG. 2A.

Figure 2A:
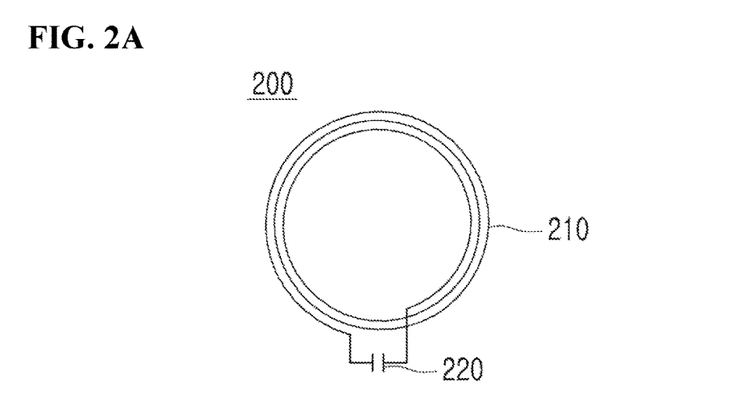
FIGS. 2A and 2B are diagrams illustrating an internal structure of a relay coil included in a wireless power relay device according to an embodiment of the present invention, and a circuit including the relay coil.
Figure 2B:
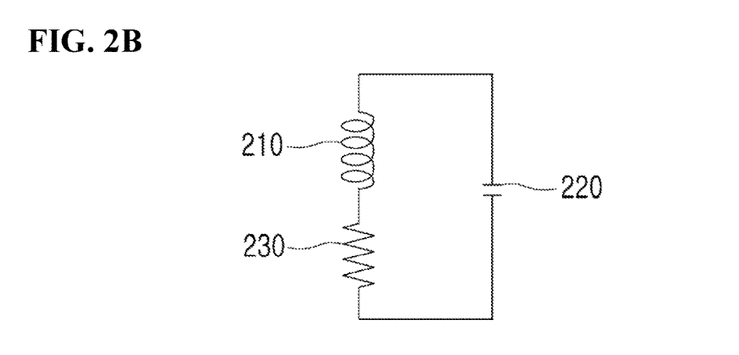

FIG. 2B illustrates an equivalent circuit including the coil 210 of FIG. 2A, an internal resistor 230 of the coil 210, and the capacitor 220. A resonant frequency at a relay coil operates may be set by controlling a value L of the coil 210 and a value C of the capacitor 220. For example, the value L of the coil 210 may be measured to determine a desired resonant frequency, and the value C of the capacitor 220 may be controlled to set the desired resonant frequency as a resonant frequency.

As described above, when the wireless power relay device 200 includes a plurality of relay coils, the efficiency of charging some relay coils may decrease under influence of neighboring coils. A position at which the efficiency of charging decreases will be referred to as a transmission-efficiency reducing section or a relay hole. In the transmission-efficiency reducing section, a sufficient amount of power is not supplied to the wireless power receiving device 300 and thus charging of the wireless power receiving device 300 may be delayed or prevented.

The transmission-efficiency reducing section may occur as a flux sum of some relay coils decreases under influence of neighboring relay coils, e.g., according to the value Q of the neighboring relay coils, a frequency of the wireless power receiving device 300, the arrangement of the neighboring relay coils, etc.

TABLE 1

| relay coil to which power is transmitted from wireless power transmission device | Transmission efficiency |
|---|---|
| 20-1 | 68 |
| 20-2 | 66 |
| 20-3 | 65 |
| 20-4 | 64 |
| 20-5 | 62 |
| 20-6 | 58 |
| 20-7 | 54 |
| 20-8 | 50 |
| 20-9 | 15 |
| 20-10 | 48 |

Figure 3:
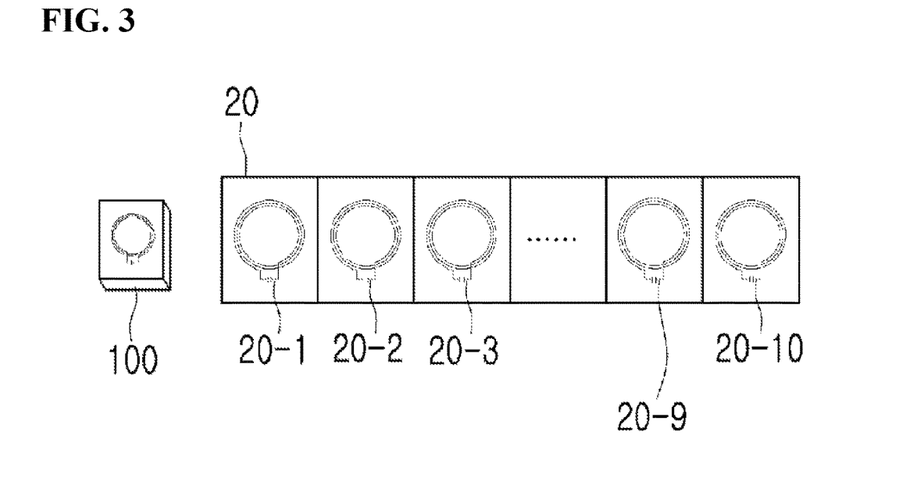
FIG. 3 is a schematic diagram of a wireless power transmission device and a wireless power relay device including first relay coil parts arranged in a line.

Table 1 above shows transmission efficiency in a wireless power relay device including relay coils arranged in a line as illustrated in FIG. 3.

Referring to FIG. 3 and Table 1, a wireless power relay device 20 includes ten relay coils 20-1, 20-2, . . . , 20-10, and a wireless power transmission device 100 may be arranged at a side of the wireless power relay device 20. That is, the relay coil 20-1 may be arranged next to the wireless power transmission device 100, and the relay coils 20-2, . . . , 20-10 may be sequentially arranged in a line after the relay coil 20-1 to be away from the wireless power transmission device 100. All the ten relay coils 20-1, 20-2, . . . , 20-10 included in the wireless power relay device 20 may have the same number of coil turns, the same impedance value, the same capacitance value, and the same coupling coefficient.

In this case, the wireless power transmission efficiencies of the respective relay coils 20-1, 20-2, . . . , 20-10 sequentially decrease as the distance to the wireless power transmission device 100 increases as shown in Table 1.

However, the transmission efficiency, i.e., 15, of the relay coil 20-9 in front of the relay coil 20-10 farthest from the wireless power transmission device 100 is lower than the transmission efficiency, i.e., 48, of the relay coil 20-10 farthest from the wireless power transmission device 100. That is, among the relay coils 20-1, 20-2, . . . , 20-10, one of two adjacent relay coils which is closer to the wireless power transmission device 100 may be referred to as a first relay coil and the other relay coil which is farther from the wireless power transmission device 100 than the first relay coil may be referred to as a second relay coil. Here, the two adjacent relay coils should be understood to include relay coils arranged adjacent to each other in a vertical or horizontal direction.

Referring to Table 1, although the first relay coil 20-9 among the relay coils 20-1, 20-2, . . . , 20-10 is arranged closer to the wireless power transmission device 100 than the second relay coil 20-10 next to the first relay coil 20-9, the transmission efficiency of the first relay coil 20-9 is lower than that of the second relay coil 20-10.

This is because a flux sum sharply decreases in the relay coil 20-9 in front of the relay coil 20-10 farthest from the wireless power transmission device 100 under influence of neighboring relay coils as described above.

Destructive interference occurs due to the difference between phases of magnetic fields received from at least two neighboring relay coils.

$$Z_{in} \propto \omega^2 \cdot M_{in}^2 \quad \text{(Formula 1)}$$

Here, $M_{in}$ represents mutual inductance between a relay coil in which a relay hole occurs and a relay coil adjacent thereto.

Thus, a transmission-efficiency reducing section may be prevented from occurring by appropriately adjusting mutual inductance in a transmission-efficiency reducing section in which a relay hole occurs. In this case, the adjustment of the mutual inductance in the transmission-efficiency reducing section may be performed by adjusting a coupling coefficient K of a relay coil in this section.

A relay coil having a different coupling coefficient K from those of the other relay coils among a plurality of relay coils of a wireless power relay device to adjust mutual inductance in the transmission-efficiency reducing section as described above is referred to as a phase-variable relay coil. The relay coils other than the phase-variable relay coil may have the same coupling coefficient K.

In other words, a wireless power relay device according to an embodiment of the present invention may include a plurality of relay coils, and a phase-variable relay coil among the plurality of relay coils may relay a magnetic field to be out of phase with the magnetic field relayed by the other relay coils. The phase-variable relay coil may have a larger coupling coefficient than those of the other relay coils so that the phase-variable relay coil may relay the magnetic field to be out of phase with the magnetic field relayed by the other relay coils.

Figure 4A:
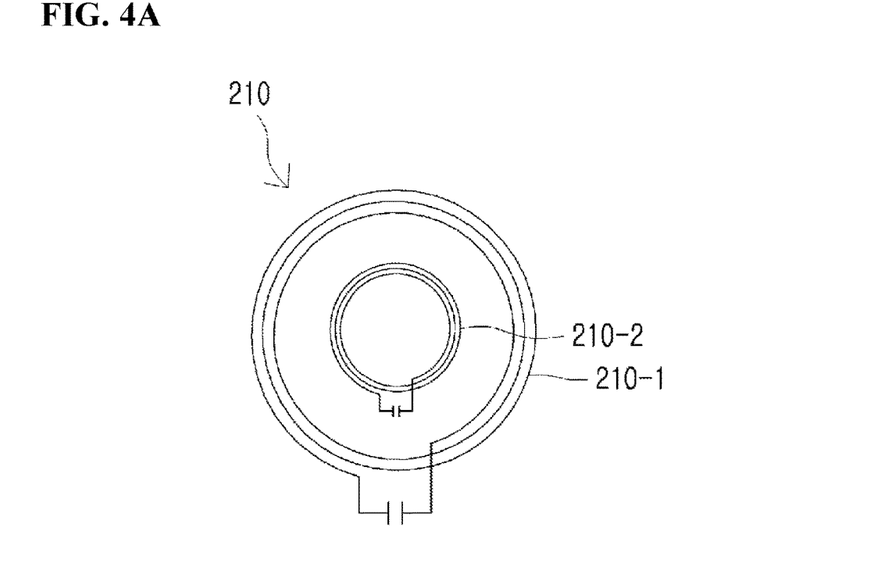
FIGS. 4A and 4B are diagrams illustrating examples of an internal structure of a phase-variable relay coil included in a wireless power relay device according to an embodiment of the present invention.
Figure 4B:
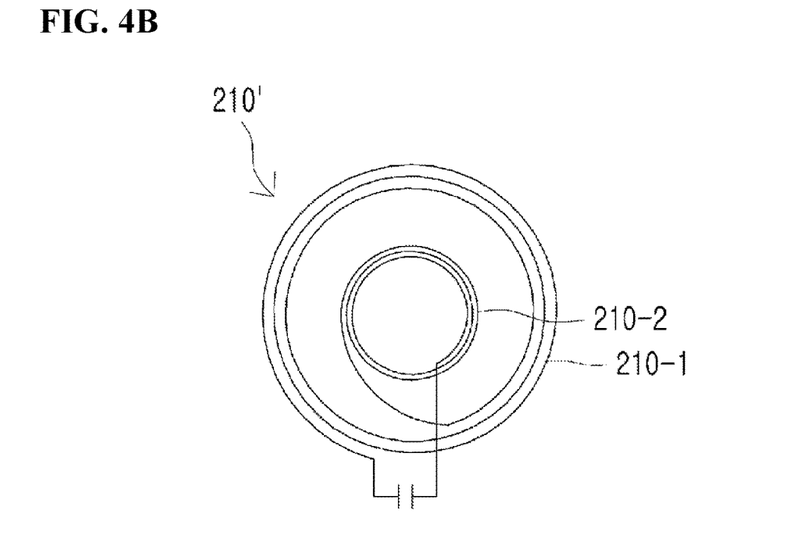

FIGS. 4A and 4B illustrate structures of phase-variable relay coils 210 and 210' having different coupling coefficients K from those of relay coils adjacent thereto. As illustrated in FIGS. 4A and 4B, each of the phase-variable relay coils 210 and 210' may include a coil 210-1 which is the same as other relay coils (hereinafter referred to as an outer coil) and may further include a coil 210-2 having a smaller internal diameter than that of the outer coil 210-1 (hereinafter referred to as an inner coil). In this case, the outer coil 210-1 and the inner coil 210-2 may be separate coils which are not connected to each other as illustrated in FIG. 4A or may be connected to each other as illustrated in FIG. 4B.

In the phase-variable relay coil 210, the outer coil 210-1 and the inner coil 210-2 may have different coupling coefficients $K_1$ and $K_2$. Thus, a net coupling coefficient K of the phase-variable relay coil 210 is different from coupling coefficients of other relay coils (first relay coil parts). Although it is described herein that the phase-variable relay coil 210 has a dual coil structure, the phase-variable relay coil 210 is not limited to the dual coil structure and may have a multi-coil structure in which three or more coils having different internal diameters overlap one another.

A transmission-efficiency reducing section including the phase-variable relay coil 210 may occur at a different location according to the arrangement of relay coils of the wireless power relay device 200.

Figure 5:
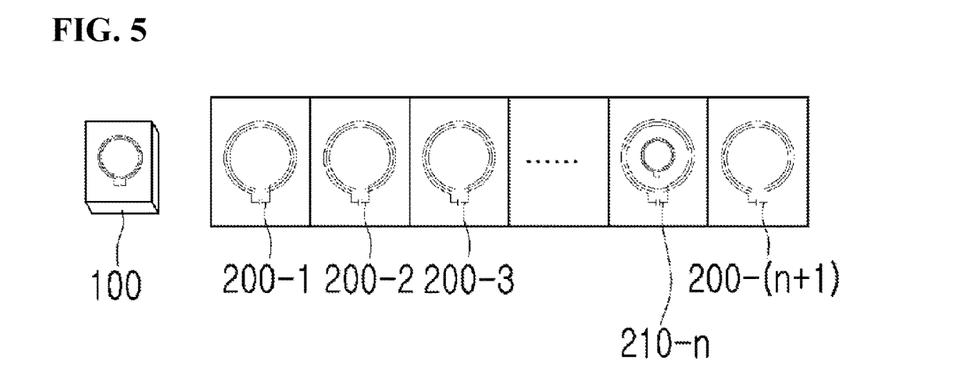
FIG. 5 is a diagram illustrating a wireless power transmission system including a one-dimensional (1D) wireless power relay device.

FIG. 5 illustrates a wireless power relay device 200 including a plurality of relay coils arranged one-dimensionally. Referring to FIG. 5, the wireless power relay device 200 is an (N+1, 1) relay system in which a total of (N+1) relay coils 200-1 to 200-(n+1) are sequentially arranged starting from the relay coil 200-1 adjacent to a wireless power transmission device 100. In this case, a relay hole occurs in the relay coil 200-n in front of the relay coil 200-(n+1) farthest from the wireless power transmission device 100. This is because a flux sum of a wave reflected from the relay coil 200-(n+1) and a magnetic field generated by the relay coil 200-(n−1) sharply decreases.

Thus, in the case of the wireless power relay device 200 arranged one-dimensionally, the relay coil 200-n in front of the relay coil 200-(n+1) farthest from the wireless power transmission device 100 may be embodied as the phase-variable relay coil 210 to suppress a relay hole from occurring in the wireless power relay device 200.

TABLE 2

| relay coil to which power is transmitted from wireless power transmission device | Transmission efficiency |
|---|---|
| 200-1 | 68 |
| 200-2 | 66 |
| 200-3 | 65 |
| 200-4 | 64 |
| 200-5 | 63 |
| 200-6 | 60 |
| 200-7 | 56 |
| 200-8 | 53 |
| 210-9 | 52 |
| 200-10 | 50 |

Table 2 above shows transmission efficiency of a wireless power relay device including first relay coil parts and a phase-variable relay coil.

Referring to Table 2, the wireless power relay device includes ten relay coils arranged in a line. These relay coils may include nine relay coils 200-1, 200-2, 200-3, . . . , 200-8, and 200-10, and one phase-variable relay coil 200-9. As described above, the phase-variable relay coil 200-9 may have a different coupling coefficient from those of the other relay coils 200-1, 200-2, 200-3, . . . , 200-8, and 200-10, and may be arranged in front of the relay coil 200-10 farthest from the wireless power transmission device 100, i.e., in a section corresponding to a relay hole. As shown in Table 2, the power transmission efficiency of the phase-variable relay coil 210-9 arranged in the section corresponding to the relay hole is not lower than that of the relay coil 200-10.

Figure 6:
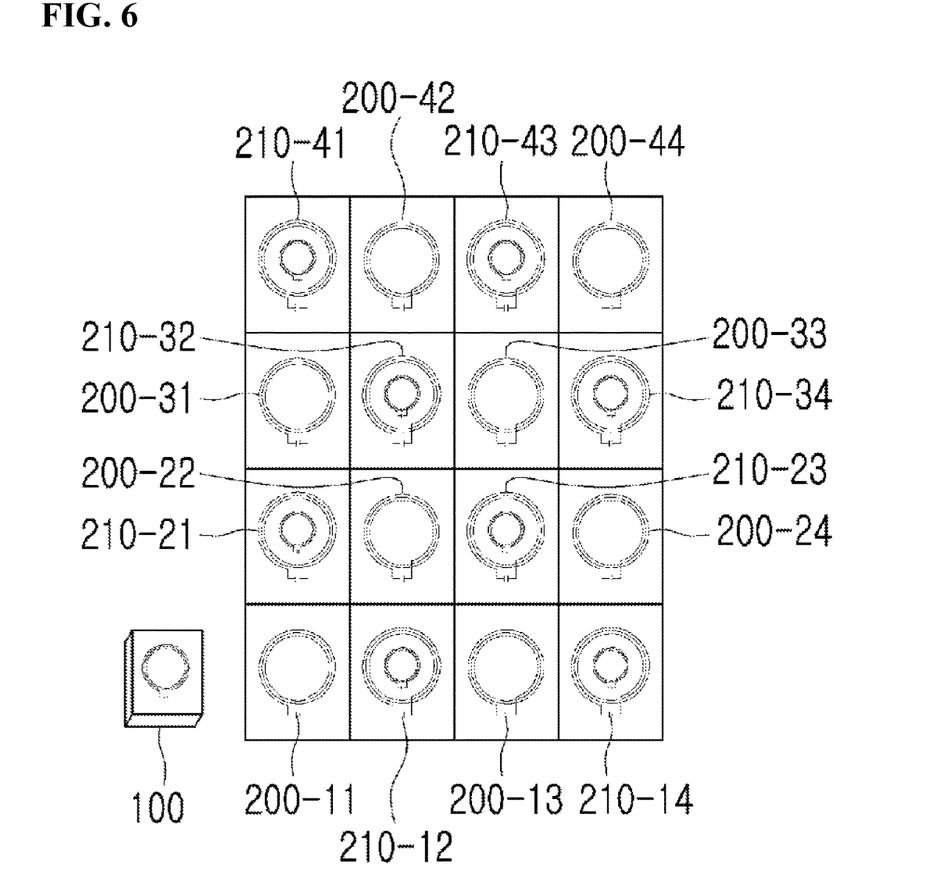
FIG. 6 is a diagram illustrating a wireless power transmission system including a two-dimensional (2D) wireless power relay device.

FIG. 6 illustrates a wireless power relay device 200 including a plurality of relay coils arranged two-dimensionally. Referring to FIG. 6, the wireless power relay device 200 may be an (M, N) relay system in which the plurality of relay coils are sequentially arranged in the form of a two-dimensional (2D) square or rectangle, starting from a relay coil 200-11 adjacent to a wireless power transmission device 100. For convenience of explanation, FIG. 6 illustrates that the wireless power relay device 200 is a (4, 4) relay system.

In this case, each of the plurality of relay coils arranged two-dimensionally may be magnetically coupled to at least two neighboring relay coils and thus a relay hole may occur in more sections than when the plurality of relay coils are arranged one-dimensionally.

In this case, transmission-efficiency reducing sections in which a relay hole occurs may be relay coils spaced by an odd number of hops from a relay coil 200-11 next to the wireless power transmission device 100 in forward, backward, left and right directions. For example, in the embodiment of FIG. 6, points at which relay coils 210-12 and 210-21 spaced by one hop from the relay coil 200-11, relay coils 210-14, 210-23, 210-32, and 210-41 spaced by three hops from the relay coil 200-11, and relay coils 210-34 and 210-43 spaced by five hops from the relay coil 200-11 are arranged are very likely to be transmission-efficiency reducing sections. Thus, a relay hole may be suppressed from being generated in the wireless power relay coil 200 by arranging the phase-variable relay coil 210 in the transmission-efficiency reducing sections described above.

TABLE 3

| Position of relay coil | Transmission efficiency 1 | Transmission efficiency 2 |
|---|---|---|
| 11 | 62 | 60 |
| 12 | 26 | 57 |
| 13 | 58 | 53 |
| 14 | 24 | 45 |
| 21 | 28 | 58 |
| 22 | 58 | 56 |
| 23 | 25 | 51 |
| 24 | 55 | 52 |
| 31 | 56 | 50 |
| 32 | 33 | 45 |
| 33 | 52 | 48 |
| 34 | 20 | 50 |
| 41 | 23 | 48 |
| 42 | 54 | 56 |
| 43 | 15 | 45 |
| 44 | 50 | 53 |

Figure 7:
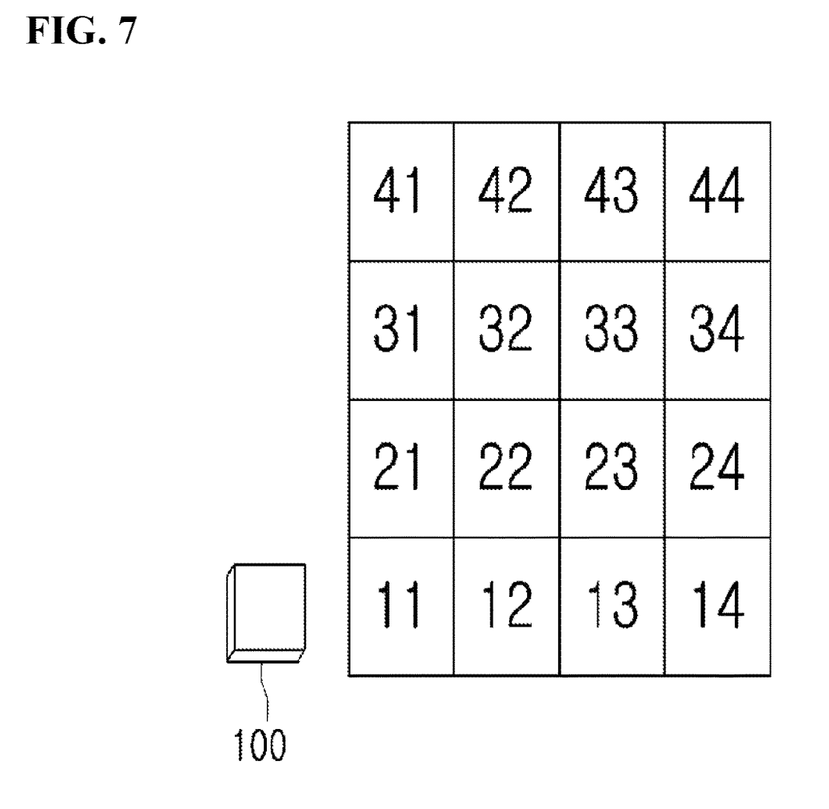
FIG. 7 is a diagram schematically illustrating positions of relay coils arranged in a 4×4 array.

Table 3 above shows transmission efficiency of a wireless power relay device including relay coils arranged in a 4×4 array. FIG. 7 is a diagram schematically illustrating positions of relay coils arranged in a 4×4 array. That is, referring to Table 3 and FIG. 7, relay-coil position 11 is a position next to a wireless power transmission device 100, and relay-coil positions 12, 13, and 14 are sequentially located in a line beside the relay-coil position 11. Relay-coil positions 21, 22, 23, and 24 are above the relay-coil positions 11, 12, 13, and 14. Relay-coil positions 31, 32, 33, and 34 are above the relay-coil positions 21, 22, 23, and 24. Relay-coil positions 41, 42, 43, and 44 are above the relay-coil positions 31, 32, 33, and 34.

In Table 3, transmission efficiency 1 represents transmission efficiencies of relay coils when the relay coils 200 are arranged on all the relay-coil positions 11, 12, . . . , 43, and 44, and transmission efficiency 2 represents transmission efficiencies of different relay coils and a phase-variable relay coil 210 when the phase-variable relay coil 210 is arranged in a transmission-efficiency reducing section in which a relay hole occurs and the different relay coils are arranged on other locations as illustrated in FIG. 6.

Referring to Table 3, when first relay coil parts having the same coupling coefficient are arranged on all the relay-coil positions 11, 12, . . . , 43, and 44, a relay hop occurs in a relay coil spaced by an odd number of hops from a relay coil next to the wireless power transmission device 100, thereby decreasing transmission efficiency.

In contrast, when the phase-variable relay coil 210 is arranged at a position at which a relay hole occurs, transmission efficiency in the relay hole is prevented from decreasing as in transmission efficiency 2 in Table 3.

Through the above structure, in a wireless power relay device according to the present invention, a phase-variable relay coil among a plurality of relay coils may be arranged in a transmission-efficiency reducing section to prevent power transmission efficiency from sharply decreasing in this section.

The above description is merely intended to describe examples of the technical idea of the present invention. Thus, the present invention may be embodied in many different forms without departing from the scope of the invention by those of ordinary skill in the technical field to which the invention pertains.

Thus, the embodiments set forth herein are not intended to restrict the scope of the present invention and are only provided to describe the technical idea of the present invention. Thus, the scope of the present invention should not be construed as being limited to these embodiments.

Therefore, the scope of the invention should be defined by the appended claims, and all differences within the scope will be construed as being included in the present invention.

The invention claimed is:

1. A wireless power relay device which relays a magnetic field generated by a wireless power transmission device, the wireless power relay device comprising:
   a plurality of relay coils and at least one phase-different relay coil configured to capture and relay the magnetic field,
   wherein the wireless power relay device is configured such that the at least one phase-different relay coil is located in a transmission-efficiency reducing section at which there is a decrease in a flux sum from the magnetic field relayed by the plurality of relay coils,
   wherein the at least one phase-different relay coil is configured such that a coupling coefficient between the at least one phase-different relay coil and relay coils of the plurality of relay coils is larger than coupling coefficients between relay coils of the plurality of relay coils to vary a phase of the magnetic field at the transmission-efficiency reducing section,
   wherein the at least one phase-different relay coil is configured to relay the magnetic field with a phase different than that of the magnetic field relayed by the plurality of relay coils,
   wherein the at least one phase-different relay coil each comprises:
   an outer coil having a first inner diameter; and an inner coil arranged inside the outer coil and having a second inner diameter smaller than the first inner diameter.

2. The wireless power relay device of claim 1, wherein, when the plurality of relay coils are arranged in a line with respect to the wireless power transmission device, the transmission-efficiency reducing section is a section in which a relay coil next to a relay coil farthest from the wireless power transmission device is located.

3. The wireless power relay device of claim 1, wherein, when the plurality of relay coils are arranged on a plane, the transmission-efficiency reducing section is a section in which a relay coil spaced by an odd number of hops from a relay coil next to the wireless power transmission device is located.

4. A wireless power transmission system comprising:
a wireless power transmission device configured to transmit power through a magnetic field; and
a wireless power relay device including a plurality of relay coils and at least one phase-different relay coil configured to capture and relay the magnetic field,
wherein the wireless power relay device is configured such that the at least one phase-different relay coil is located in a transmission-efficiency reducing section at which there is a decrease in a flux sum from the magnetic field relayed by the plurality of relay coils,
wherein the at least one phase-different relay coil is configured such that a coupling coefficient between the at least one phase-different relay coil and relay coils of the plurality of relay coils is larger than coupling coefficients between relay coils of the plurality of relay coils to vary a phase of the magnetic field at the transmission-efficiency reducing section,
wherein the at least one phase-different relay coil is configured to relay the magnetic field with a phase different than that of the magnetic field relayed by the plurality of relay coils,
wherein the at least one phase-different relay coil each comprises:
an outer coil having a first inner diameter; and
an inner coil arranged inside the outer coil and having a second inner diameter smaller than the first inner diameter.

5. The wireless power transmission system of claim 4, wherein, when the plurality of relay coils are arranged in a line with respect to the wireless power transmission device, the transmission-efficiency reducing section is a section in which a relay coil next to a relay coil farthest from the wireless power transmission device is located.

6. The wireless power transmission system of claim 4, wherein, when the plurality of relay coils are arranged on a plane, the transmission-efficiency reducing section is a section in which a relay coil spaced by an odd number of hops from a relay coil next to the wireless power transmission device is located.

* * * * *